(12) United States Patent
Harding et al.

(10) Patent No.: US 11,787,636 B1
(45) Date of Patent: Oct. 17, 2023

(54) SPIRAL CHUTE

(71) Applicant: Interroll Holding AG, Sant Antonino (CH)

(72) Inventors: Tom Harding, Canon City, CO (US); Scott Harrison, Canon City, CO (US); Michael Harrell, Canon City, CO (US)

(73) Assignee: Interroll Holding AG, Sant' Antonino (CH)

( * ) Notice: Subject to any disclaimer, the term of this patent is extended or adjusted under 35 U.S.C. 154(b) by 0 days.

(21) Appl. No.: 17/749,202

(22) Filed: May 20, 2022

(51) Int. Cl.
*B65G 11/06* (2006.01)

(52) U.S. Cl.
CPC .......... *B65G 11/06* (2013.01); *B65G 2207/08* (2013.01)

(58) Field of Classification Search
None
See application file for complete search history.

(56) References Cited

U.S. PATENT DOCUMENTS

| | | | | |
|---|---|---|---|---|
| 1,353,873 A | * | 9/1920 | Wego | B65G 11/066 |
| | | | | 193/12 |
| 1,515,890 A | * | 11/1924 | Sekulski | B65G 11/063 |
| | | | | 72/419 |
| 7,513,352 B2 | * | 4/2009 | Sawall | B65G 11/103 |
| | | | | 193/25 C |
| 9,415,936 B1 | * | 8/2016 | Rodriguez | B65G 11/163 |
| 11,155,413 B2 | * | 10/2021 | Stock | B65G 11/183 |

FOREIGN PATENT DOCUMENTS

WO      2016018868 A2    2/2016

* cited by examiner

*Primary Examiner* — Kavel Singh
(74) *Attorney, Agent, or Firm* — Michael Soderman

(57) ABSTRACT

Spiral chute (1), adapted to convey an object from an inlet (I) to an outlet (O) downwards along a sliding area (S) in a sliding manner, wherein the sliding area (S) defines a spiral conveying direction (D); the spiral chute (1) comprises a plurality of steps (6), which are arranged along the spiral conveying direction (D), each of the steps having a sliding face (62) for vertically supporting the sliding objects; wherein the spiral chute is adapted so that an inclination angle (i) of the sliding face (62) relative to the horizontal plane can selectively be adapted.

9 Claims, 4 Drawing Sheets

Fig. 2A
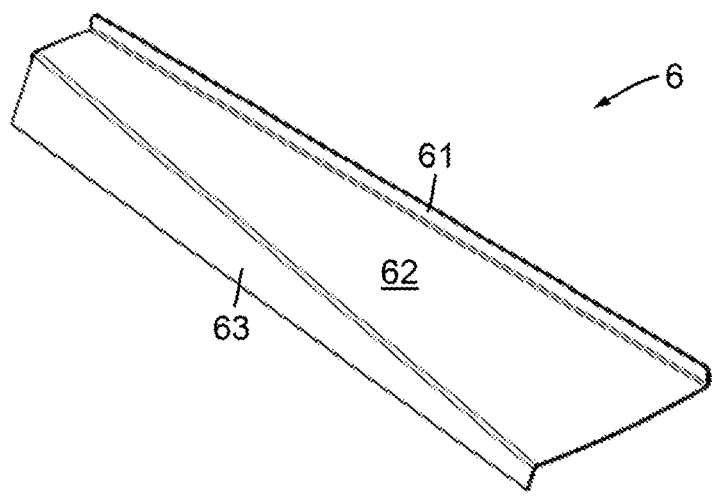
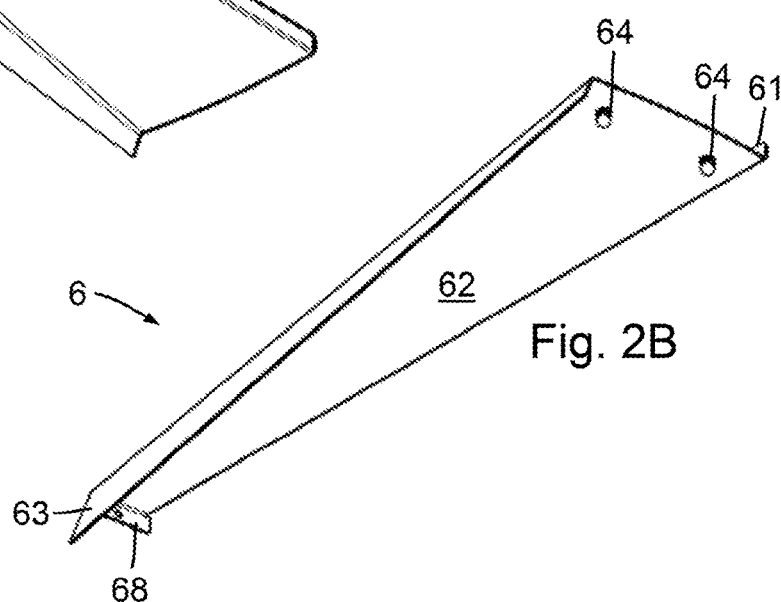
Fig. 2B
Fig. 3A
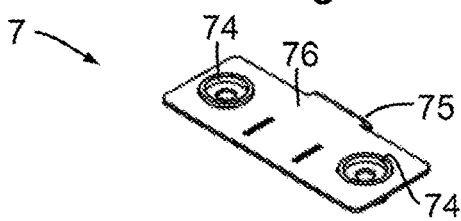
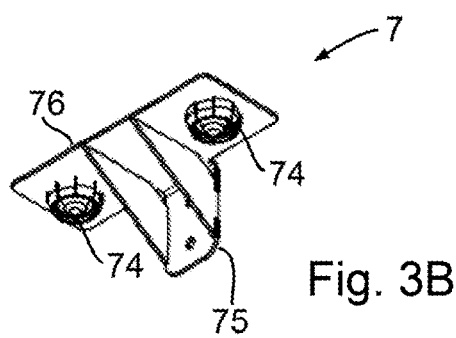
Fig. 3B

SPIRAL CHUTE

CROSS REFERENCE TO RELATED APPLICATIONS

None.

BACKGROUND

The invention refers to a spiral chute.

A spiral chute is known from U.S. Pat. No. 10,766,702 B2. An object to be conveyed is provided at an elevated inlet. The object then slides along a spiral conveying path downwards by gravity to an outlet, which is located at a lower level. The advantage of a spiral chute is that the object can overcome a large height difference with small inclination. Compared to non-spiral chutes, the spiral chute merely occupies a small footprint in top view.

In a chute the conveying operation is merely initiated by gravity. Usually no actuators are provided to drive the object during the sliding between the inlet to the outlet. The objects are provided at the inlet at a certain initial speed from a preceding conveying device, in particular from a sorting device, located upstream of the chute. The conveying characteristics of a chute are static, since no actuator influence to the conveying process.

In a chute there is always a compromise between conveying speed and damage prevention for the objects. The lower the conveying speed the higher is the risk of an object getting stuck within the chute, in particular in case of larger but lightweight objects. The larger the conveying speed is the higher is the risk for a damage of objects, when said object hits another object.

WO 2016/018868 A2 discloses a spiral chute, where the sliding surface has a plurality of stepped chute segments. For controlling the speed of n conveyed object a plurality of low friction plastic panels are provided. The number of low friction panels that are positioned on each angular chute segment is dependent on the height of the angular chute segment in the helical chute system such that the number of panels per chute segment decreases as the chute segment descends about the vertical axis.

SUMMARY

It is an object of the present invention to provide an improved helical chute for conveying objects.

The invention proposes a spiral chute and a method according to the main claims.

DETAILED DESCRIPTION

According to the invention the chute has plurality of steps with a sliding face. For adapting the speed of the object to be conveyed, the angle of the sliding face can be adjusted. As a consequence, the speed and/or acceleration of an object at a particular location within the chute can be selectively adapted.

BRIEF DESCRIPTION OF THE DRAWINGS

The invention is described with respect to the figures; herein show

FIG. 2A shows a sliding step of the chute according to FIG. 1 in a perspective view from above, FIG. 2B shows a sliding step of the cute according to FIG. 1 in a perspective view from below, FIG. 3A shows a step fastener of the chute according to FIG. 1 in a perspective view from above, FIG. 3B shows a step fastener of the chute according to FIG. 1 in a perspective view from below.

DETAILED DESCRIPTION OF THE PREFERRED EMBODIMENTS

Figure 1A:
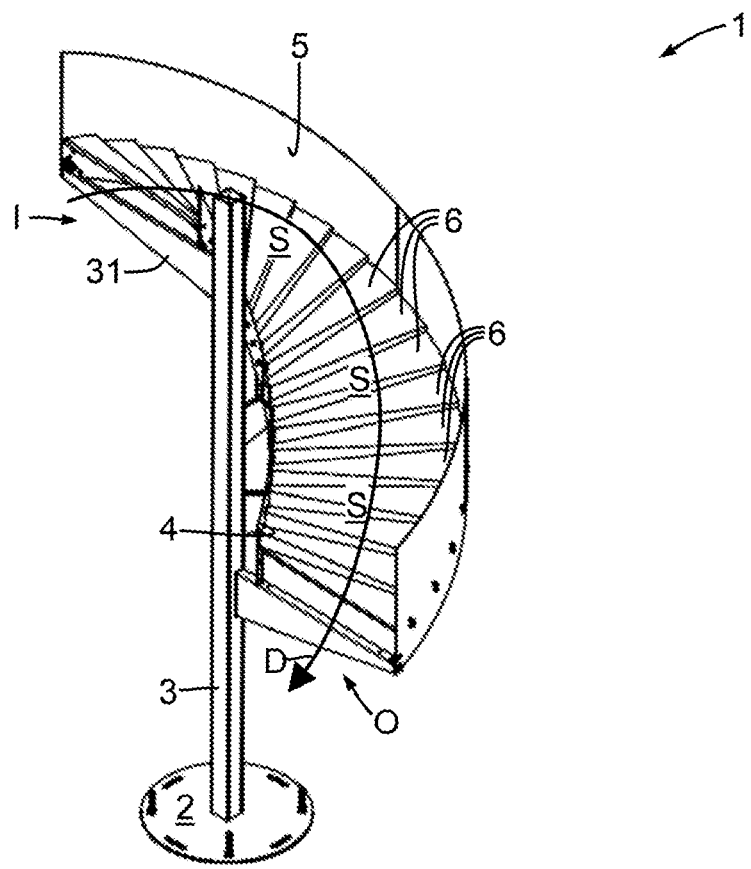
FIG. 1A shows an inventive spiral chute in a perspective view.
Figure 1B:
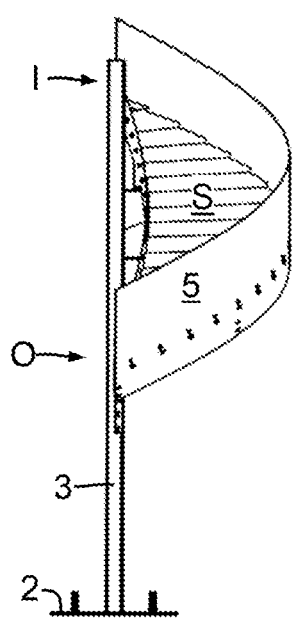
FIG. 1B shows an inventive spiral chute from a side view.
Figure 1C:
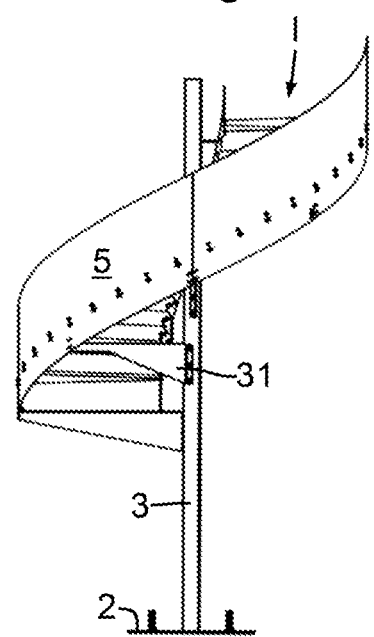
FIG. 1C shows an inventive spiral chute from a side view from a different direction.
Figure 1D:
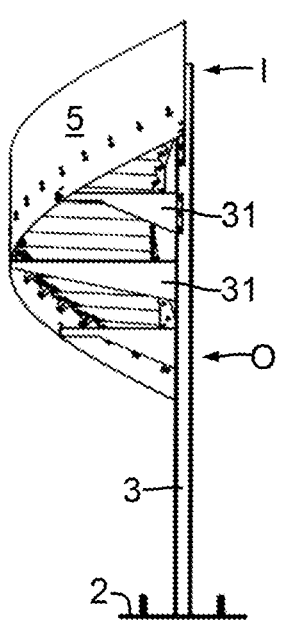
FIG. 1D shows an inventive spiral chute from a side view from yet another direction.

FIG. 1 shows a spiral chute 1 according to an exemplary embodiment of the invention. The chute 1 defines a sliding area S, in which objects (not shown) can slide downwards from an inlet Ito an outlet O in along a spiral conveying direction D. Here the spiral conveying direction encloses an angle of about 180°, when viewed from above; it is to be understood, that any other angle may be possible.

The spiral chute comprises a base 2, for reliably attaching the chute 1 to a floor. Here the chute may be fixedly attached to the floor e.g. by screws not shown) or just by gravitational force.

Attached to the base 2 is a vertically extending center post 3. Along the center post, several carrier legs 31 are protruding in radial outward direction. Attached to the carrier leg 31 is a radial inner lining 4 and a radial outer lining 5.

The radial inner lining 4 delimits the sliding area S in radial inwards direction when viewed horizontally from the center post 3; the radial inner lining 4 is located between the sliding area S and the center post 3. In an embodiment the inner lining 4 can be omitted or may be integrally formed with the center post 3.

The radial outer lining 5 delimits the sliding area S in radial outwards direction when viewed horizontally from the center post 3. In particular the outer lining 5 is adapted to prevent a conveyed object (not shown) from flying away radially outward due to centrifugal force.

A plurality of individual steps 6 forms a conveying surface of the sliding area S. The steps 6 delimit the sliding area S in a vertical downward direction. In particular the steps 6 are adapted to prevent, that the object (not shown) falls downward in an undefined manner. The steps 6 are arranged in a stepped manner in the conveying direction D (see FIG. 6).

Each step 6 (see FIG. 2) comprises a main body made from bended sheet metal. Each step 6 comprises an upper skirt 61 a lower skirt 63 and a sliding face 62 between the upper skirt 61 and the lower skirt 63, which are all integrally formed by said bended sheet metal body. Radially inward of the sliding face 62 an attachment protrusion 68 is provided, at which the steps can be attached to the center post 3 and/or to the inner lining 4.

The sliding face 62 forms the area of the steps 6, where the objects slide along.

Figure 4A:
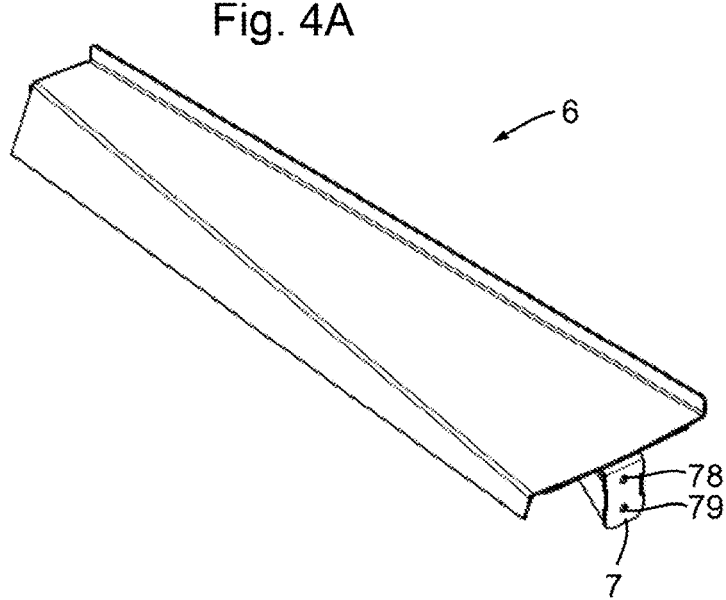
FIG. 4A shows the sliding step according to FIG. 2 with an attached step fastener according to FIG. 3 in perspective view from above.
Figure 4B:
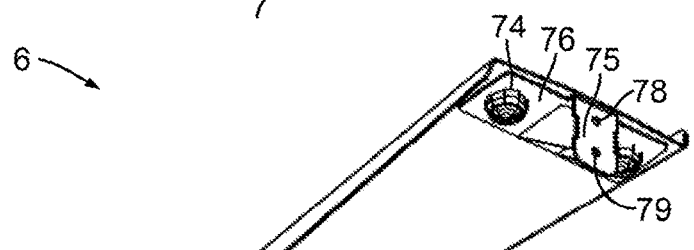
FIG. 4B shows the sliding step according to FIG. 2 with an attached step fastener according to FIG. 3 in perspective view from below.
Figure 5:
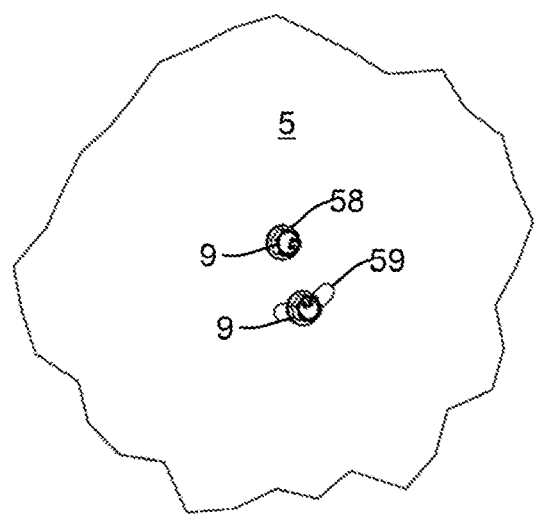
FIG. 5 shows a section of an outer lining of the chute according to FIG. 1 in perspective view, where a step fastener according to FIG. 3 is attached.

Each step 6 is attached via an fastener 7 to the outer liner 5 (see FIGS. 4 and 5). In the embodiment shown in FIGS. 3 and 4, the fastener is made from a separate piece than the sliding face. In an alternative embodiment the fastener 7 is made integral with sliding face 62 in the same bended sheet metal part.

The fastener 7 has two fastener holes, a first fastener hole 78 and a second fastener hole 79. The outer lining 5 has at a respective fixing location two lining holes 58, 59. A first lining hole 58 has a circular shape, a second lining hole 59 has an elongated, curved shape. For attaching the fastener 7 to the outer lining 5 the first fastener hole 78 is aligned with the first lining hole 58 and the second fastener hole 79 is aligned with the second lining hole 59.

Due its shape the second hole 59 enables, that the step 6 can be fixed at the outer lining 5 selectively at different inclination angles i relative to the horizontal plane (see FIG. 6). Thereby the inclination angle i of the steps 6 can be adjusted individually for each step (see the variants in FIG. 6a-d).

By selectively adjusting the inclination angle the speed and/or acceleration of the objects in the chute can be adjusted. As an example in the boxes in the right area of FIGS. 6a-d a simplified diagram of the acceleration of the objects within the shown sections of the chute is illustrated. The smaller the inclination angle i (see FIG. 6c), the smaller is the acceleration a; the larger the inclination angle i (see FIG. 6b), the larger is the acceleration a. It is possible that adjacent steps are arranged in different inclination angles independently of each other (see FIG. 6d).

It is to be understood that the exact acceleration is dependent also from other parameters such as the coefficient of friction, the speed of the object when entering an individual step and so on. So the boxes in the right area of FIGS. 6a-d provide merely a qualitative statement.

The fastener holes 78, 79 and the lining holes 58, 59 together with the screws 9 constitute adjustment and fixation means, adapted to enable selective adjustment of the inclination angle i individually and independently for each step 6 and subsequently to fix each adjusted step in the respective angular orientation. In case the screws are loosened, the fixation means are in a released state where the inclination angle I can be adjusted. In case the screws are fastened, the fixation means are in a fixed state where the inclination angle I cannot be adjusted and is stationary until loosened at a later point of time. There are plenty of other fixing means possible. Important thereby is the functionality to selectively enable (released state) and prohibit (fixed state) the adjustment of the inclination angle i.

Figure 6A:
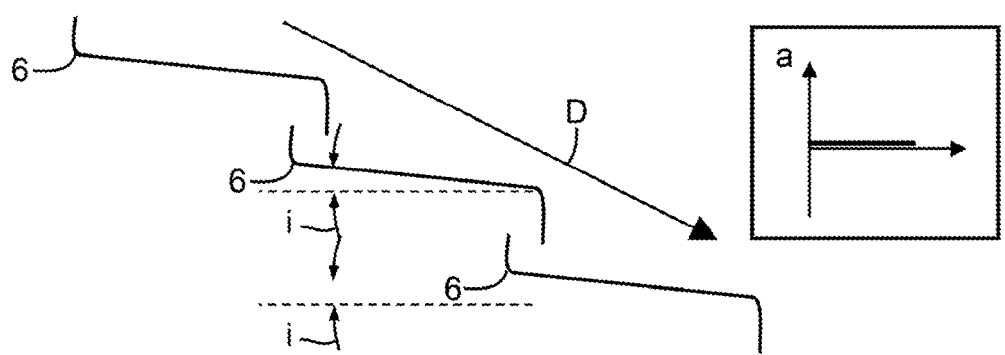
FIG. 6A shows cross-sections through a group of steps arranged at one inclination angle.
Figure 6B:
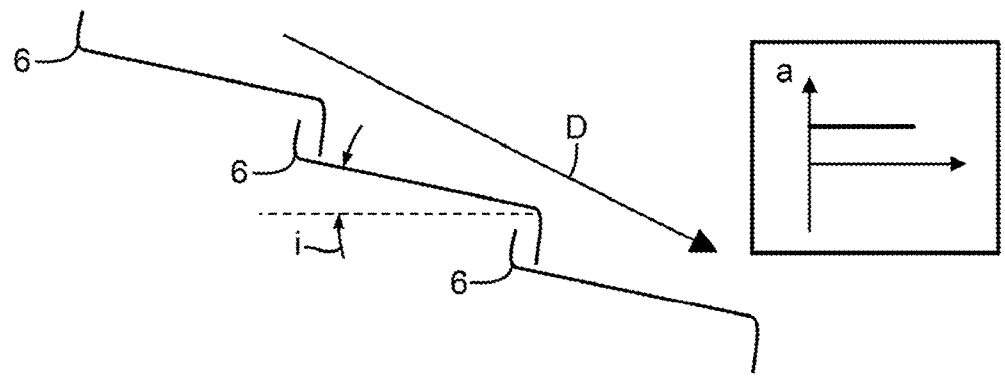
FIG. 6B shows cross-sections through a group of steps arranged at a second inclination angle.
Figure 6C:
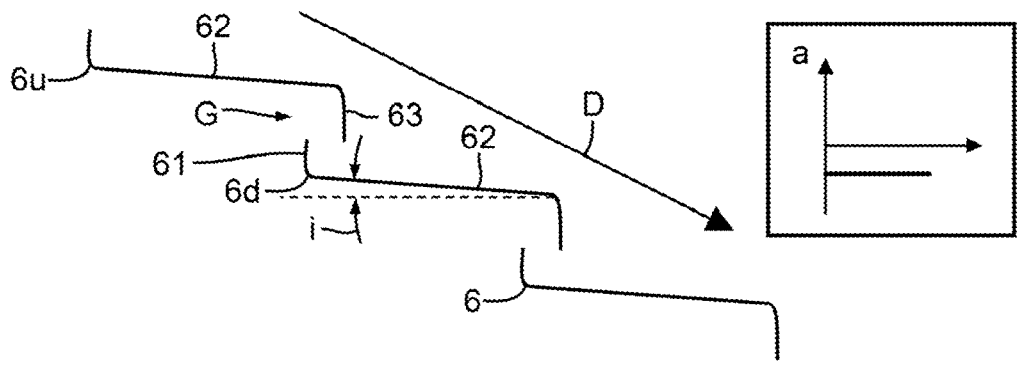
FIG. 6C shows cross-sections through a group of steps arranged at a third inclination angle.
Figure 6D:
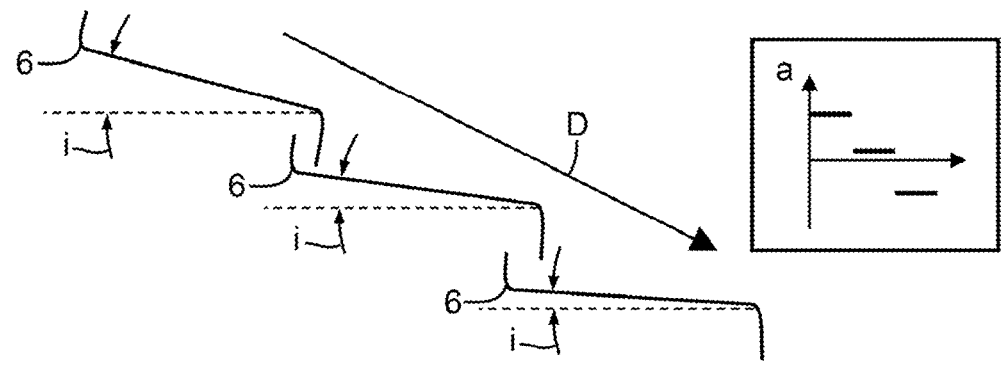
FIG. 6D shows cross-sections through a group of steps arranged at a fourth inclination angle.

The function of the optional skirts 61, 63 is apparent e.g. from FIG. 6c. Due to the flexibility in the angular orientation of the steps 6, gaps G are located between the individual sliding faces 62 of said individual steps 6. The skirts 61, 63 reduce the risk, that an object may fall unintentionally through one of the gaps G. Therefore it is preferred that a lower skirt 63 of a downstream step 6d overlaps an upper skirt 61 of an upstream step 6u, when viewed in the conveying direction D.

In the embodiment of FIGS. 2 and 3, the fastener 7 is made separate from the one piece bended step 6. The fastener 7 is a separate bended piece, which can be selectively attached to the steps 6 in particular by a snap fit 64, 74. The snap fit comprises an attaching protrusion 64 and an attaching receptable 74, to which the attaching protrusion 64 can be snaped in.

As an example the attaching protrusion 64 is located at an underside of the step; facing downwards. The attaching receptacle 74 is located on the upper side of the fastener 7, facing upwards.

The fastener has a lateral face 75, comprising said first and second fastener holes 78, 79 (see FIG. 4). The lateral face 75 is facing said outer lining 5. The fastener has an upper face, facing the lower side of the step 6, at which the attaching protrusions are located.

LIST OF REFERENCE NUMERALS 1 spiral chute
2 base
3 center post
31 carrier leg
4 inner lining
5 outer lining
58 first lining hole
59 second lining hole
6 steps
61 upper skirt
62 sliding face
63 lower skirt
64 attaching protrusion
68 inner attachment
7 fastener
74 attaching receptacle
75 lateral face
76 upper face
78 first fastener hole
79 second fastener hole
9 screw
I Inlet
O Outlet
S sliding area
D spiral conveying direction
G gap
i inclination angle
a conveying acceleration

The invention claimed is:

1. Spiral chute (1), adapted to convey an object from an inlet (I) to an outlet (O) downwards along a sliding area (S) in a sliding manner, wherein the sliding area (S) defines a spiral conveying direction (D);

the spiral chute (1) comprises a plurality of steps (6), which are arranged along the spiral conveying direction (D), each of the steps having a sliding face (62) for vertically supporting the sliding objects;

wherein each step is attached via a fastener to an outer liner, said fastener having a first fastener hole and a second fastener hole aligning with a first outer liner hole and a second outer liner hole, said fastener holes and outer liner holes, together with screws constitute release and fixation means, configured to enable a selective change of the inclination angle i of each step to adapt the speed of the spiral chute to each object to be conveyed if necessary, and subsequently to fix each step in the respective angular orientation.

2. Spiral chute (1) according to claim 1,
wherein fixing means are provided, the fixing means being transferable between a released state and a fixed state;
wherein during the released state an inclination angle (i) of the sliding face (62) can be adjusted;
wherein during the fixed state said inclination angle (i) of the sliding face (62) is constant.

3. Spiral chute (1) according to claim 1,
wherein fixing means comprise at least one screw (9), adapted to attach the step (6) to an outer lining (5).

4. Spiral chute (1) according to claim 1,
wherein the sliding face (62) and/or a step (6) is attached to an outer lining (5) via a snap fit (64, 74).

5. Spiral chute (1), adapted to convey an object from an inlet (I) to an outlet (O) downwards along a sliding area (S) in a sliding manner, wherein the sliding area (S) defines a spiral conveying direction (D);
the spiral chute (1) comprises a plurality of discrete steps (6), which are arranged along the spiral conveying direction (D), each of the steps having a sliding face (62) for vertically supporting the sliding objects;
characterized in
that the steps (6) comprising a skirt (61, 63) located in front of the sliding face (62) or behind of the sliding face (62) when viewed in conveying direction (D) wherein the skirt comprising an upper skirt (61) located in front of the sliding face (62) and facing upwards from the sliding face (62) and wherein the skirt comprising a lower skirt (63) located behind the sliding face (62) and facing downwards from the sliding face (62),
wherein the lower skirt (63) of an upstream step (6*u*) overlaps an upper skirt (61) of a downstream step (6*d*) wherein each step is attached via a fastener to an outer liner, said fastener having a first fastener hole and a second fastener hole aligning with a first outer liner hole and a second outer liner hole, said fastener holes and outer liner holes, together with screws constitute release and fixation means, configured to enable a selective change of the inclination angle i of each step to adapt the speed of the spiral chute to each object to be conveyed if necessary, and subsequently to fix each step in the respective angular orientation.

6. Spiral chute (1) according to claim 5, wherein said skirt is located in a gap (G) between the sliding faces (62) of adjacent steps (6).

7. Method of operating a spiral chute (1), in particular a chute according to claim 1,
the spiral chute is adapted to convey an object from an inlet (I) to an outlet (O) downwards along a sliding area (S) in a sliding manner, wherein the sliding area (S) defines a spiral conveying direction (D);
the spiral chute (1) comprises a plurality of steps (6), which are arranged along the spiral conveying direction (D) and which have a sliding face (62) for
vertically supporting the sliding objects;
wherein the method comprises the step of
reducing an acceleration of said object by reducing an inclination angle (i) relative to the horizontal plane of at least one sliding face (62) or
increasing an acceleration of said object by increasing said inclination angle (i) relative to the horizontal plane of at least one sliding face (62), wherein each step is attached via a fastener to an outer liner, said fastener having a first fastener hole and a second fastener hole aligning with a first outer liner hole and a second outer liner hole, said fastener holes and outer liner holes, together with screws constitute release and fixation means, configured to enable a selective change of the inclination angle i of each step to adapt the speed of the spiral chute to each object to be conveyed if necessary, and subsequently to fix each step in the respective angular orientation.

8. Method of operating a spiral chute (1) according to claim 7, wherein the method comprises the step of adjusting an inclination angle (i) relative to the horizontal plane of sliding faces (62) of several steps (6) independently of each other.

9. Method of operating a spiral chute (1) according to claim 7, prior to adjusting the inclination angle (i), comprising a step of transferring a fixing means from a fixed state into a released state,
subsequent to adjusting the inclination angle (i), comprising a step of transferring a fixing means from said released state into said fixed state, wherein in the released state selective adjustment of the inclination angle is enabled and
in the fixed state selective adjustment of the inclination angle is prevented.

\* \* \* \* \*